3,309,535
SWITCHING CIRCUITRY FOR SEMICONDUCTIVE
CONTROLLED RECTIFIERS
James F. Sutherland and Tibor D. Rubner, Pittsburgh,
Pa., assignors to Westinghouse Electric Corporation,
Pittsburgh, Pa., a corporation of Pennsylvania
Filed Aug. 28, 1964, Ser. No. 392,736
11 Claims. (Cl. 307—88.5)

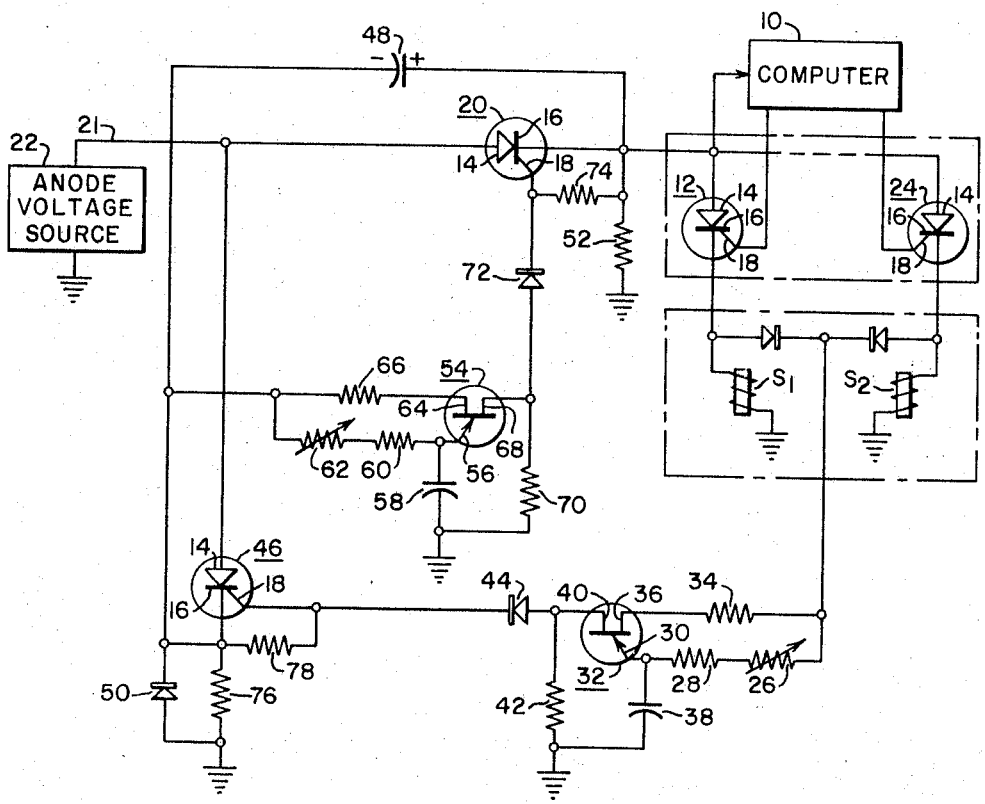

This invention relates to circuitry for use in turning off semiconductive controlled rectifiers which have previously been fired, and more particularly to circuitry for controlling such rectifiers utilized in on-off switching applications.

As is known, semiconductive controlled rectifiers, similar in operation to thyratrons, have found widespread use as solid-state switching elements in electrical control systems. Such rectifiers are characterized in that once they are fired or driven into conduction by the application of a firing pulse to their gate electrodes, the gate loses control and the rectifier can be turned off only by reducing the anode current below a certain holding current value.

In many circuit applications it is, of course, necessary to provide switches which can be closed for a short period of time only. In the case of semiconducting controlled rectifiers, therefore, some means must be provided for momentarily breaking the anode circuit to the rectifier, after which the anode circuit is restored preparatory to subsequent firing or closing operation. At the same time, the anode circuit can be interrupted only after a predetermined time lapse following initial firing in order to permit current flow through the rectifier to accomplish its desired function. It is, accordingly, a primary object of the invention to provide circuitry for breaking the anode circuit to a semiconductive controlled rectifier after a first predetermined time lapse following its initial firing, followed by restoration of the anode circuit after a second predetermined time lapse.

Stated in other words, an object of the invention is to provide an improved semiconductive controlled rectifier switch which allows current to flow through a load for a first adjustable time period $T_1$ and then blocks the flow of current during a second adjustable time period $T_2$. At the completion of time $T_2$, the switch is reactivated, and the cycle is repeated if the rectifier is again fired.

A further object of the invention is to provide improved circuitry for breaking the anode circuit of all of a plurality of parallel-connected semiconductive controlled rectifiers for a predetermined period of time, after which a selected one of the rectifiers can again be fired.

Still another object of the invention is to provide improved circuitry of the type described which is more simple and economical in construction and which employs solid-state circuit elements.

The above and other objects and features of the invention will become apparent from the following detailed description taken in connection with the accompanying single figure drawing which schematically illustrates one embodiment of the invention.

In accordance with the invention, a first semiconductive controlled rectifier, connected in series with an electrical load, has its anode circuit connected through a second semiconductive controlled rectifier to a source of anode potential. Connected in shunt with the anode potential source is a current path including a third semiconductive controlled rectifier. When the first controlled rectifier in series with the load fires, a pulse is sent back through a time delay circuit to fire the third controlled rectifier and cut off the second controlled rectifier. During this time, therefore, the anode circuit for the first controlled rectifier in series with the load is broken and it cuts off. Finally, after a period of time determined by a second delay circuit, the second and third rectifiers are fired and cut off, respectively, whereby the anode circuit to the first controlled rectifier is again completed preparatory to a following switching action.

With reference now to the drawing, the invention is shown in one illustrative embodiment as a means for controlling the actuating print and function magnets or solenoids of a print-out typewriter associated with a computer. The computer is designated generally by the reference numeral 10, and the solenoids for the typewriter are identified as $S_1$ and $S_2$, it being understood that the number of solenoids will be greatly multiplied in an actual installation. Connected in series with the solenoid $S_1$ is a first silicon controlled rectifier 12 having an anode 14, a cathode 16 and a gate electrode 18. One terminal of the solenoid $S_1$ is connected to ground as shown; and the anode of the rectifier 12 is connected through a second silicon controlled rectifier 20 to the positive terminal of an anode voltage source 22 having its negative terminal connected to ground. The anode circuit for rectifier 12, therefore, is through elements 22, 20 and $S_1$; and in the claims which follow the "output terminals" of anode voltage source comprise lead 21 and ground, respectively.

In a somewhat similar manner, a second silicon controlled rectifier 24, also having an anode 14, cathode 16 and gate electrode 18, is connected in series with the solenoid $S_2$, the anode 14 of rectifier 24 being connected through rectifier 20 to the anode voltage source 22.

As was mentioned above, the silicon controlled rectifiers 12 and 24 are the equivalents of thyratrons. Each rectifier acts as a two-terminal switch and will block current flow in either direction until a critical breakover voltage is exceeded, or until a voltage, positive with respect to the cathode 16, is applied to its gate electrode 18.

Assuming, again, that the soleninds $S_1$ and $S_2$ are utilized to initiate the print and function cycles of a typewriter controlled by the computer 10, positive pulses from the computer will be applied to the gate 18 of rectifier 12 or 24, depending upon the intelligence output of the computer. If, for example, the intelligence output of the computer 10 dictates that an "A" should be printed by the typewriter, and assuming that the solenoid $S_1$ is utilized to initiate the "A" print cycle, then a positive pulse will be applied to the gate electrode 18 of rectifier 12, thereby energizing the solenoid $S_1$. As was mentioned above, however, once the silicon controlled rectifier 12 is fired or rendered conducting, it can be cut off only by breaking its anode circuit and reducing the current below a certain holding current value. However, the anode circuit cannot be broken until current is flowing through the solenoid $S_1$ for a sufficient period of time enabling the typewriter key associated with it to accomplish its desired function.

The circuitry hereinafter described, therefore, enables the rectifier 12, for example, to conduct for a predetermined period of time, after which its anode circuit is broken to deenergize the solenoid $S_1$. Following this action, the anode circuit is again established preparatory to a subsequent signal received from the computer 10. This same action applies, of course, to the rectifier 24 as well as any one of a number of other rectifiers connected to the output of computer 10.

The cathodes 16 of the rectifiers 12 and 24 are connected through resistors 26 and 28 to the emitter 30 of a first unijunction transistor 32. The cathodes 16 of rectifiers 12 and 24 are also connected through a resistor 34 to the base-2 electrode 36 of the transistor 32. Thus, when rectifier 12 fires, for example, a positive voltage level is fed back to base-2 electrode 36 and emitter 30. Connected between the emitter 30 and ground is a capacitor 38; and it will be appreciated that the combination of capacitor 38 and resistors 26 and 28 comprises a time delay circuit, the time delay period of which can be controlled by the variable resistance 26. Thus, after a time delay, $T_1$, determined by elements 26, 28 and 38, the unijunction transistor 32 breaks down, discharging capacitor 38 and producing a positive output pulse at its base-1 electrode 40 which appears across resistor 42. This positive pulse is applied through diode 44 to the gate electrode 18 of a silicon controlled rectifier 46. When the silicon controlled rectifier 46 fires, the capacitor 48, charged with the polarity shown, discharges through resistor 52 and the selected load $S_1$. In this process, a positive voltage, of magnitude about twice that of the supply voltage from source 22, is applied to the cathode 16 of the rectifier 20, thereby cutting off this rectifier and breaking the anode circuit to rectifier 12 or 24, as the case may be. Thus, the rectifier 12 or 24 will now cut off at the expiration of a period determined by the time delay circuit comprising elements 26, 28 and 38. When the capacitor 48 discharges, the load voltage is reduced substantially to zero.

As soon as the rectifier 46 is fired and rectifier 20 starts turning off, the second unijunction transistor 54 comes into action. Its emitter electrode 56 is connected to ground through a capacitor 58, and to capacitor 48 through resistors 60 and 62. Capacitor 48 is also connected to the base-1 electrode 64 of transistor 54 through a resistor 66. Finally, the base-2 electrode 68 of the transistor 54 is connected to ground through resistor 70. When the silicon controlled rectifier 46 is fired, a positive voltage will be applied to the emitter 56 sufficient to initiate break-down in the unijunction transistor 54 after a second period determined by the time delay circuit comprising elements 58, 60 and 62. When transistor 54 breaks down after the second time delay $T_2$, it discharges capacitor 58 and produces, through resistor 70 and diode 72, a positive pulse at the gate electrode 18 of rectifier 20. The gate electrode 18 is connected to the cathode 16 of rectifier 20 through resistor 74 as shown. Thus, rectifier 20 now fires and the capacitor 48, through resistors 76 and 78, applies a positive voltage about twice the value of the supply voltage to the cathode 16 of rectifier 46, turning off this rectifier. At this point, the circuit is in its original condition preparatory to a second cycle wherein a positive pulse is applied to the gate electrode 18 of rectifier 12 or 24.

Unijunction transistors 32 and 54 are employed in the circuit for firing rectifiers 20 and 46 because of their reliability and because their timing is farly independent of supply voltage, which will vary depending upon the load. Diode 50 prevents spurious firing of silicon controlled rectifier 46 due to changes in supply voltage, since a change in supply voltage is transmitted to the cathode of rectifier 46 via capacitor 48. The effect of the diode 50 is to clamp the cathode of rectifier 46 at 0.6 volt negative in one illustrative embodiment of the invention. With the gate electrode 18 of rectifier 46 tied to ground through diode 44 which must support 0.6 volt when conducting, a line transient cannot forward bias the gate-to-cathode junction of rectifier 46.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Apparatus for interrupting the anode circuit to a semiconductive controlled rectifier at the termination of a first period $T_1$ following firing of the rectifier and for thereafter restoring the anode circuit at the termination of a second period $T_2$, comprising a normally closed switch device in said anode circuit, first time delay means responsive to the current flow through said switch device for opening said switch device to break said anode circuit at the completion of the period $T_1$, and second time delay means responsive to the opening of said switch device for again closing said switch device to restore said anode circuit at the completion of the period $T_2$.

2. Apparatus for interrupting the anode circuit to a semiconductive controlled rectifier at the termination of a first period $T_1$ following firing of a first semiconductive controlled rectifier and for thereafter restoring the anode circuit at the termination of a second period $T_2$, comprising a normally closed second semiconductive controlled rectifier in said anode circuit, first time delay means responsive to current flow through said first semiconductive controlled rectifier for cutting off the second semiconductive controlled rectifier to break said anode circuit at the completion of the period $T_1$, and second time delay means responsive to the operation of said first time delay means for firing said second semiconductive controlled rectifier to restore said anode circuit at the completion of the period $T_2$.

3. Apparatus for interrupting the anode circuit to a semiconductive controlled rectifier at the termination of a first period $T_1$ following firing of a first semiconductive controlled rectifier and for thereafter restoring the anode circuit at the termination of a second period $T_2$, comprising a normally closed second semiconductive controlled rectifier in said anode circuit, first time delay means for cutting off the second semiconductive controlled rectifier to break said anode circuit at the completion of the period $T_1$, second time delay means for firing said second semiconductive controlled rectifier to restore said anode circuit at the completion of the period $T_2$, each of said time delay means including a normally non-conducting unijunction transistor having an emitter electrode, and means responsive to the firing of said first semiconductive controlled rectifier for applying a voltage to the emitter electrode of the unijunction transistors in each time delay means at the completion of the periods $T_1$ and $T_2$, respectively.

4. Apparatus for interrupting the anode circuit for a plurality of semiconductive controlled rectifiers connected in parallel across the terminals of an anode voltage source at the termination of a first period $T_1$ following firing of any one of the semiconductive controlled rectifiers in parallel and for thereafter restoring the anode circuit at the termination of a second period $T_2$, comprising a normally closed switch device in said anode circuit, first time delay means responsive to the firing of any one of said parallel connected rectifiers for opening said switch device to break said anode circuit at and thereby remove said anode voltage from each of said rectifiers the completion of the period $T_1$, and second time delay means for closing said switch device to restore said anode circuit to again provide said anode voltage to each of said rectifiers at the completion of the period $T_2$.

5. Apparatus for interrupting the anode circuit for a plurality of semiconductive controlled rectifiers connected in parallel across the terminals of an anode voltage source at the termination of a first period $T_1$ following firing of any one of the semiconductive controlled rectifiers in parallel and for thereafter restoring the anode circuit at the termination of a second period $T_2$, comprising a common semiconductive controlled rectifier in said anode circuit for all of the parallel-connected semiconductive controlled rectifiers, first time delay means responsive to the firing of any one of said parallel-connected rectifiers, for cutting off the common semiconductive controlled rectifier to break said anode circuit at the completion of the period $T_1$ and second time delay means and responsive to the operation of said first time delay means and operative at the completion of the period $T_2$ for firing said common semiconductive controlled rectifier to restore said anode circuit at the completion of the period $T_2$.

6. Apparatus for interrupting the anode circuit for a semiconductive controlled rectifier connected across the terminals of an anode voltage source at the termination of a first period $T_1$ following firing of the semiconductive controlled rectifier and for thereafter restoring the anode circuit at the termination of a second period $T_2$, comprising a second semiconductive controlled rectifier in said anode circuit, a third semiconductive controlled rectifier connected in shunt across said input terminals, means for normally rendering said second semiconductive controlled rectifier conducting and the third semiconductive controlled rectifier non-conducting, first time delay means responsive to firing of the first-mentioned semiconductive controlled rectifier for initiating conduction in the third semiconductive controlled rectifier and for cutting off the second semiconductive controlled rectifier at the completion of the period $T_1$, and second time delay means operative at the completion of the period $T_1$ for again initiating conduction in the second semiconductive controlled rectifier while cutting off the third semiconductive controlled rectifier at the expiration of the period $T_2$.

7. The apparatus of claim 6 wherein the first time delay means is connected to the cathode of the first-mentioned semiconductive controlled rectifier, and including a unijunction transistor for applying a delayed pulse to the gate electrode of the third semiconductive controlled rectifier to render it conductive.

8. The apparatus of claim 6 wherein one of said output terminals of the anode voltage source is connected to the anode of said second semiconductive controlled rectifier, and including a capacitor and a unidirectional current device connected between the cathode of said second semiconductive controlled rectifier and the other output terminal of the anode voltage source.

9. The apparatus of claim 6 wherein each of said first and second time delay means includes a capacitor connected between the emitter and one of the base electrodes of a unijunction transistor.

10. Apparatus for interrupting the anode circuit for a semiconductive controlled rectifier connected across the terminals of an anode voltage source at the termination of a first period $T_1$ following firing of the semiconductive controlled rectifier and for thereafter restoring the anode circuit at the termination of a second period $T_2$, comprising a second semiconductive controlled rectifier in said anode circuit, a third semiconductive controlled rectifier connected in shunt across said input terminals, means for normally rendering said second semiconductive controlled rectifier conducting and the third semiconductive controlled rectifier non-conducting, first time delay means including a unijunction transistor having its emitter and one of its base electrodes connected to the cathode of the first-mentioned semiconductive controlled rectifier, a unidirectional current device connecting the other base electrode of said unijunction transistor to the gate electrode of said third semiconductive controlled rectifier whereby the third rectifier will be fired at the completion of the period $T_1$, a connection between the anode of the second semiconductive controlled rectifier and one of said input terminals, means including a capacitor connected between the cathode of the second semiconductive controlled rectifier and the other of said input terminals whereby initiation of conduction in the third semiconductive controlled rectifier will discharge said capacitor to cut off the second semiconductive controlled rectifier, second time delay means including a unijunction transistor having its emitter and one base electrode connected to said capacitor, and means including a unidirectional current device connecting the other base electrode of said latter-mentioned unijunction transistor to the gate electrode of the second semiconductive controlled rectifier whereby the second time delay means is operative upon discharge of said capacitor and at the termination of the period $T_2$ for again initiating conduction in the second semiconductive controlled rectifier.

11. The apparatus of claim 10 wherein each of said time delay means includes resistive elements and a capacitor, the capacitor being connected between the emitter of an associated one of said unijunction transistors and said other input terminal.

References Cited by the Examiner

UNITED STATES PATENTS

| 3,176,158 | 3/1965 | Guignard | 307—88.5 |
| 3,192,466 | 6/1965 | Sylvan et al. | 307—88.5 |
| 3,209,174 | 9/1965 | Cole | 307—88.5 |

FOREIGN PATENTS 953,394  3/1964  Great Britain.

ARTHUR GAUSS, *Primary Examiner.*

I. C. EDELL, R. E. EPSTEIN, *Assistant Examiners.*